US010609659B2

(12) United States Patent
Tayamon et al.

(10) Patent No.: US 10,609,659 B2
(45) Date of Patent: Mar. 31, 2020

(54) CONFIGURING TRANSMISSION POWER OF A TRANSMISSION BY A WIRELESS COMMUNICATION DEVICE (71) Applicant: Telefonaktiebolaget LM Ericsson (publ), Stockholm (SE)

(72) Inventors: Soma Tayamon, Stockholm (SE); Luis Felipe Del Carpio Vega, Espoo (FI); Wei Shen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/098,320

(22) PCT Filed: May 12, 2017

(86) PCT No.: PCT/SE2017/050485
§ 371 (c)(1),
(2) Date: Nov. 1, 2018

(87) PCT Pub. No.: WO2017/200465
PCT Pub. Date: Nov. 23, 2017

(65) Prior Publication Data
US 2019/0174435 A1 Jun. 6, 2019

Related U.S. Application Data (60) Provisional application No. 62/337,324, filed on May 16, 2016.

(51) Int. Cl.
*H04W 52/48* (2009.01)
*H04W 52/38* (2009.01)
(Continued)

(52) U.S. Cl.
CPC ......... *H04W 52/48* (2013.01); *H04W 52/146* (2013.01); *H04W 52/245* (2013.01);
(Continued)

(58) Field of Classification Search
None
See application file for complete search history.

(56) References Cited

U.S. PATENT DOCUMENTS 8,452,872 B2 * 5/2013 Castro Castro ..... H04M 15/775
709/224
8,606,893 B2 * 12/2013 Sanchez Santisto ... H04L 12/14
709/222
(Continued)

FOREIGN PATENT DOCUMENTS

CN 105557055 A * 5/2016 ........ H04W 74/0808
EP 2915382 A1 * 9/2015 ........... H04W 52/28
WO 2007043925 A1 4/2007
WO 2016072704 A1 5/2016

OTHER PUBLICATIONS

IEEE Computer Society, "Draft Standard for Information technology—Telecommunications and information exchange between systems Local and metropolitan area networks—Specific requirements Part 11: Wireless LAN Medium Access Control (MAC) and Physical Layer (PHY) Specifications Amendment 6: Enhancements for High Efficiency WLAN", IEEE P802.11ax™/D1.3, Jun. 1, 2017, pp. 1-522, IEEE.
(Continued)

Primary Examiner — Mohammed Rachedine
(74) Attorney, Agent, or Firm — Coats + Bennett, PLLC (57) ABSTRACT

Methods and devices for configuring a transmission power of a transmission by a wireless communication device (102) are provided. For instance, an example method (200) is described that includes determining (202) whether the wireless communication device (102) is to control the transmission power (114) of the transmission (104) in accordance with transmission power control commands (108) from a radio network node (106). In an aspect, the determination is based on whether the wireless communication device (102) is configured to dynamically adjust a clear channel assessment (CCA) threshold for the transmission (104) and based on a traffic type (112) conveyed by the transmission (104). The example method may also include transmitting (204)
(Continued)

the transmission (104) with a transmission power (114) that is configured based on such a determination.

18 Claims, 8 Drawing Sheets

(51) Int. Cl.
*H04W 52/14* (2009.01)
*H04W 52/24* (2009.01)
*H04W 52/28* (2009.01)
*H04W 74/08* (2009.01)

(52) U.S. Cl.
CPC ......... *H04W 52/281* (2013.01); *H04W 52/38* (2013.01); *H04W 74/0808* (2013.01)

(56) References Cited

U.S. PATENT DOCUMENTS

| | | |
|---|---|---|
| 2015/0373652 A1 | 12/2015 | Dabeer et al. |
| 2016/0037453 A1* | 2/2016 | Sivanadyan ...... H04W 52/0235 370/329 |
| 2016/0088571 A1 | 3/2016 | Choi et al. |

OTHER PUBLICATIONS

Itagaki, T. et al., "Impact of TPC coupled to DSC for legacy unfairness issue", Mar. 9, 2015, pp. 1-20, IEEE 802.11-15/0319r1, Sony Corporation.

Samsung, "CCA threshold and transmission power for LAA", 3GPP TSG RAN WG1 #82, Beijing, China, Aug. 24, 2015, pp. 1-4, R1-154139, 3GPP.

* cited by examiner

DETERMINE WHETHER THE WIRELESS COMMUNICATION DEVICE IS TO CONTROL THE TRANSMISSION POWER OF THE TRANSMISSION IN ACCORDANCE WITH TRANSMISSION POWER CONTROL COMMANDS FROM A RADIO NETWORK NODE, BASED ON WHETHER THE WIRELESS COMMUNICATION DEVICE IS CONFIGURED TO DYNAMICALLY ADJUST A CLEAR CHANNEL ASSESSMENT (CCA) THRESHOLD FOR THE TRANSMISSION AND BASED ON A TYPE OF TRAFFIC CONVEYED BY THE TRANSMISSION
202

TRANSMITTING THE TRANSMISSION WITH A TRANSMISSION POWER THAT IS CONFIGURED BASED ON THE DETERMINATION
204

```
┌─────────────────────────────────────────────┐
│  RECEIVE, FROM THE WIRELESS COMMUNICATION    │
│  DEVICE, A REQUEST MESSAGE THAT REQUESTS     │
│  PERMISSION TO TRANSMIT THE TRANSMISSION     │
│  WITHOUT APPLYING TRANSMISSION POWER         │
│  CONTROL COMMANDS TRANSMITTED BY THE         │
│  RADIO NETWORK NODE TO THE WIRELESS          │
│  COMMUNICATION DEVICE                        │
│  302                                         │
└─────────────────────────────────────────────┘
                      │
                      ▼
┌─────────────────────────────────────────────┐
│  DETERMINE, IN RESPONSE TO RECEIVING THE     │
│  REQUEST MESSAGE, WHETHER THE WIRELESS       │
│  COMMUNICATION DEVICE IS PERMITTED TO        │
│  TRANSMIT THE TRANSMISSION WITHOUT           │
│  APPLYING TRANSMISSION POWER CONTROL         │
│  COMMANDS                                    │
│  304                                         │
└─────────────────────────────────────────────┘
                      │
                      ▼
┌─────────────────────────────────────────────┐
│  TRANSMIT A RESPONSE MESSAGE TO THE          │
│  WIRELESS COMMUNICATION DEVICE, THE          │
│  RESPONSE MESSAGE INDICATING WHETHER THE     │
│  WIRELESS COMMUNICATION DEVICE IS            │
│  PERMITTED TO TRANSMIT THE TRANSMISSION      │
│  WITHOUT APPLYING THE TRANSMISSION POWER     │
│  CONTROL COMMANDS                            │
│  306                                         │
└─────────────────────────────────────────────┘
```

DETERMINE WHETHER THE WIRELESS COMMUNICATION DEVICE IS TO CONTROL THE TRANSMISSION POWER OF THE TRANSMISSION IN ACCORDANCE WITH TRANSMISSION POWER CONTROL COMMANDS FROM THE RADIO NETWORK NODE, BASED ON WHETHER THE WIRELESS COMMUNICATION DEVICE IS CONFIGURED TO DYNAMICALLY ADJUST A CLEAR CHANNEL ASSESSMENT (CCA) THRESHOLD FOR THE TRANSMISSION AND BASED ON A TYPE OF TRAFFIC CONVEYED BY THE TRANSMISSION
802

CONTROL THE WIRELESS COMMUNICATION DEVICE TO CONFIGURE THE TRANSMISSION WITH A TRANSMISSION POWER BASED ON THE DETERMINATION
804

*FIG. 8*

CONFIGURING TRANSMISSION POWER OF A TRANSMISSION BY A WIRELESS COMMUNICATION DEVICE

RELATED APPLICATION

This application claims priority to U.S. Provisional Patent Application Ser. No. 62/337,324 filed May 15, 2016, the entire contents of which are incorporated herein by reference.

TECHNICAL FIELD

The application relates to methods and devices for configuring a transmission power of a transmission by a wireless communication device.

BACKGROUND

In current wireless communication standards for WiFi communication promulgated by Institute of Electrical and Electronics Engineers (IEEE), Carrier Sensing Multiple Access with Collision Avoidance (CSMA/CA) is utilized to ensure the available wireless resources of a Wireless Local Area Network (WLAN) are made available to mobile stations (STAs) utilizing the WLAN in an efficient and uniform manner. According to CSMA/CA, every STA that wishes to send data over the available resources first tunes to a common communication channel before transmitting on the channel to determine if any other devices are currently utilizing the channel for uplink transmission. During this channel sensing process, an STA concludes that the channel is being utilized by a different STA when it detects a transmission having received signal strength level greater than a Clear Channel Assessment (CCA) threshold (CCAT) level.

Presently, a common CCAT is defined for each Access Point (AP) in a WLAN, which is utilized by each STA when performing CSMA/CA on the common communication channel associated with an AP. In certain scenarios (e.g., where a relatively small number of STAs are within the communication footprint of an AP), the common CCAT may be set at a level that is overly conservative (low) and therefore limits the performance of the system. Accordingly, dynamic sensitivity control (DSC) techniques have been proposed for improving system performance by dynamically adjusting the CCAT to a more aggressive value than is allowed in static CCAT implementations.

Complexities arise, however, when DSC techniques are employed on top of other techniques to control transmission power, such as the use of transmission power control (TPC) commands from the network.

SUMMARY

One or more embodiments herein recognize that, when higher CCAT values are implemented by STAs using an AP during DSC, transmissions by other STAs using neighboring APs may be subjected to interference from the STAs using DSC. In such cases, the transmission power of these STAs may be limited by an AP via transmission power control (TPC) commands, which correspondingly reduces the probability that a DSC-implementing STA will introduce interference into neighboring transmissions. Though implementing TPC over DSC reduces the risk of introducing interference into neighboring transmissions, this benefit comes at the cost of decreased overall system performance, particularly when TPC commands mandate transmission power levels when such a reduction is unnecessary to avoid interfering with ongoing neighbor STA transmissions. Furthermore, when this unnecessary transmission power reduction is implemented along with DSC in STAs transmitting high-priority (e.g., delay sensitive) transmissions, these important transmissions have an increased probability of being incorrectly received and decoded by APs.

One or more example embodiments herein include methods and wireless communication devices, as well as computer programs and carriers for configuring a transmission power of a transmission by the wireless communication device. In an aspect, the example embodiments include determining whether the wireless communication device is to control the transmission power of the transmission in accordance with transmission power control commands from a radio network node. Such a determination may be based on whether the wireless communication device is configured to dynamically adjust a CCA threshold for the transmission and based on a type of traffic conveyed by the transmission. Additionally, the example embodiments include transmitting the transmission with a transmission power that is configured based on the determination.

In addition, one or more example embodiments herein include methods and radio network nodes, as well as corresponding computer programs and carriers for configuring a transmission power of a transmission by a wireless communication device configured to dynamically adjust a CCA threshold for the transmission. The example embodiments may include receiving, from the wireless communication device, a request message that requests permission to transmit the transmission without applying transmission power control commands transmitted by the radio network node to the wireless communication device. Furthermore, the example embodiments include determining, in response to receiving the request message, whether the wireless communication device is permitted to transmit the transmission without applying transmission power control commands. Some embodiments further include transmitting a response message to the wireless communication device, the response message indicating whether the wireless communication device is permitted to transmit the transmission without applying the transmission power control commands.

DETAILED DESCRIPTION

A wireless communication device according to embodiments presented herein may determine whether to implement TPC commands received from a radio network node on an uplink transmission. In an aspect, the wireless communication device may determine not to control the transmission power for the transmission in accordance with the TPC commands based on a type of traffic conveyed by the transmission, for instance, where the wireless communication device implements DSC for channel access for the transmission. In some embodiments, the wireless communication device may transmit a request to the radio network node for permission to avoid implementing the TPC commands and may receive a corresponding response indicating whether the radio network node may perform the transmission without implementing the TPC commands.

Figure 1:
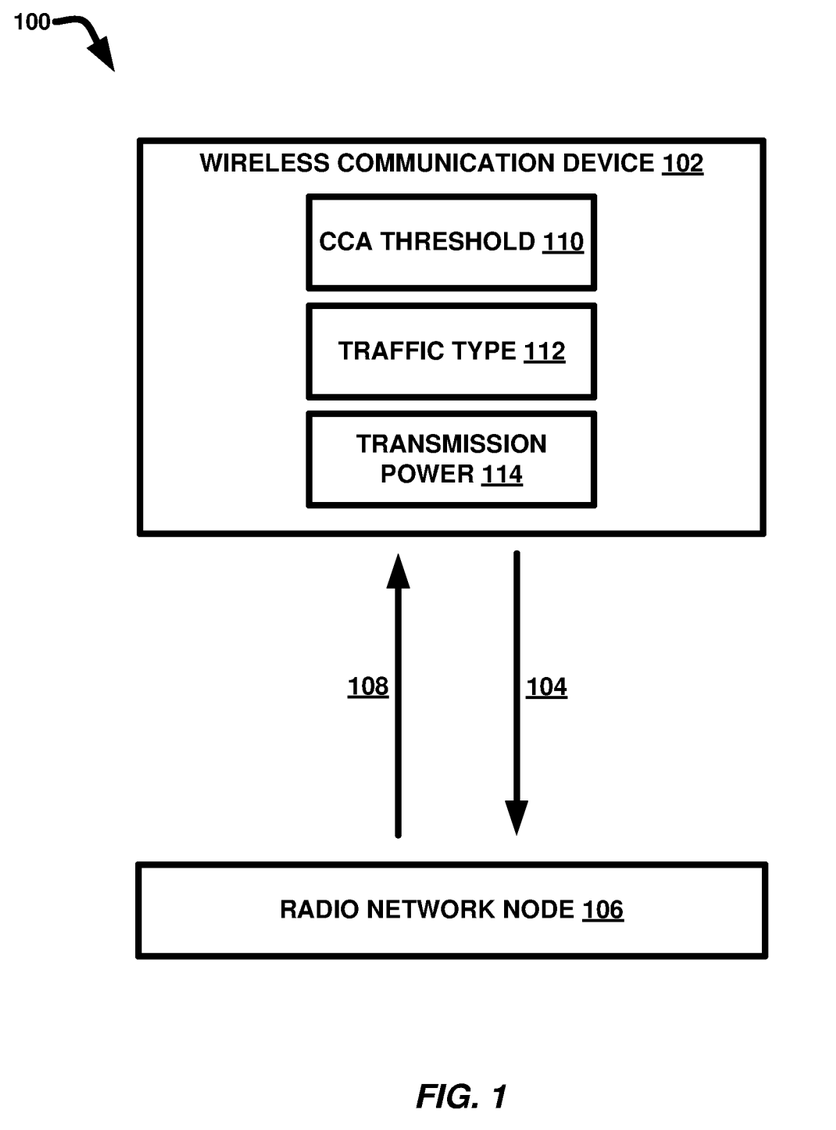
FIG. 1 illustrates a wireless communication system for implementing transmission power control, the system including a wireless communication device and a radio network node in one or more example embodiments.

FIG. 1 illustrates a wireless communication system 100 for implementing TPC for one or more transmissions by a wireless communication device 102 to a radio network node. In some examples, the wireless communication system 100 may be a WLAN system implementing communication procedures defined by the IEEE 802.11 (WiFi) family of standards, though the techniques presented herein are not meant to be limited to implementation in wireless communication systems utilizing any particular wireless communication protocols. Accordingly, the wireless communication device 102 may be an STA and the radio network node 106 (may also be referred to simply as "radio network node") may be an AP.

In some examples, the TPC techniques implemented in the wireless communication system 100 may be utilized where a transmission 104 from the wireless communication device 102 to the radio network node 106 has a particular traffic type, such as a high-priority traffic type. For purposes of the present disclosure, traffic having this high-priority traffic type may include, but is not limited to, delay-sensitive transmissions such as voice traffic, video traffic, or other traffic types characterized as having particular Quality of Service mandates. In an aspect, such high-priority traffic may be characterized as having a particular associated Enhanced Distributed Channel Access QoS access category (e.g., AC_VO, AC_VI, AC_BE, AC_BK). Furthermore, these TPC techniques may be implemented for wireless communication devices 102 utilizing dynamic CCA thresholds during common communication channel access procedures (e.g., STAs implementing DSC) when preparing to perform transmission(s) of high-priority traffic to a radio network node 106 (e.g., AP). In addition, these TPC techniques may be utilized when TPC commands are issued by the radio network node 106 to wireless communication devices utilizing DSC for channel access to perform transmission(s) for the high-priority traffic.

Accordingly, in an aspect of the wireless communication system 110, a wireless communication device 102 may determine that a CCA threshold 110 for a particular radio network node 106 is to be dynamically adjusted (i.e., that DSC is utilized for the radio network node 106). Likewise, the wireless communication system 110 may determine that a traffic type 112 for a particular transmission 104 is of a particular type (e.g., high-priority). Based on making these determinations (or a subset thereof, in some optional examples), the wireless communication device may determine whether to control the transmission power 114 of the transmission 104 in accordance with one or more TPC commands 108 from radio network node 106. In some embodiments, the wireless communication device 102 makes this determination responsive to (i.e., after) receiving the one or more TPC commands 108 according to which the wireless communication device 102 is commanded to control its transmission power 114 by the radio network node 106. In other embodiments, though, the wireless communication device 102 makes this determination in advance of (i.e., before) receiving such TPC command(s) 108, e.g., in anticipation of receiving them in the future.

In some examples, the wireless communication device 102 may determine whether to control the transmission power 114 itself, for example, based on one or more policy rules or other received or preconfigured settings.

Though not explicitly illustrated in FIG. 1, wireless communication device 102 may alternatively transmit a request (explicitly or implicitly) for permission to perform transmission 104 without implementing the received TPC command(s) 108. Responsive to receiving the request, the radio network node 106 may generate a response message indicating whether the wireless communication node is permitted to transmit transmission 104 without implementing the TPC command(s) 108 and may transmit the response message to the wireless communication device. In some examples, the wireless communication device 102 may determine whether to implement the TPC command(s) 108 for the transmission 104 based at least in part on whether permission to do so is included in the response message. In a further aspect, once the wireless communication device 102 makes the determination whether to implement the TPC command(s) 108 for the transmission 104, the wireless communication device 102 may transmit the transmission 104 with a transmission power 114 that is configured based on the determination.

Figure 2:
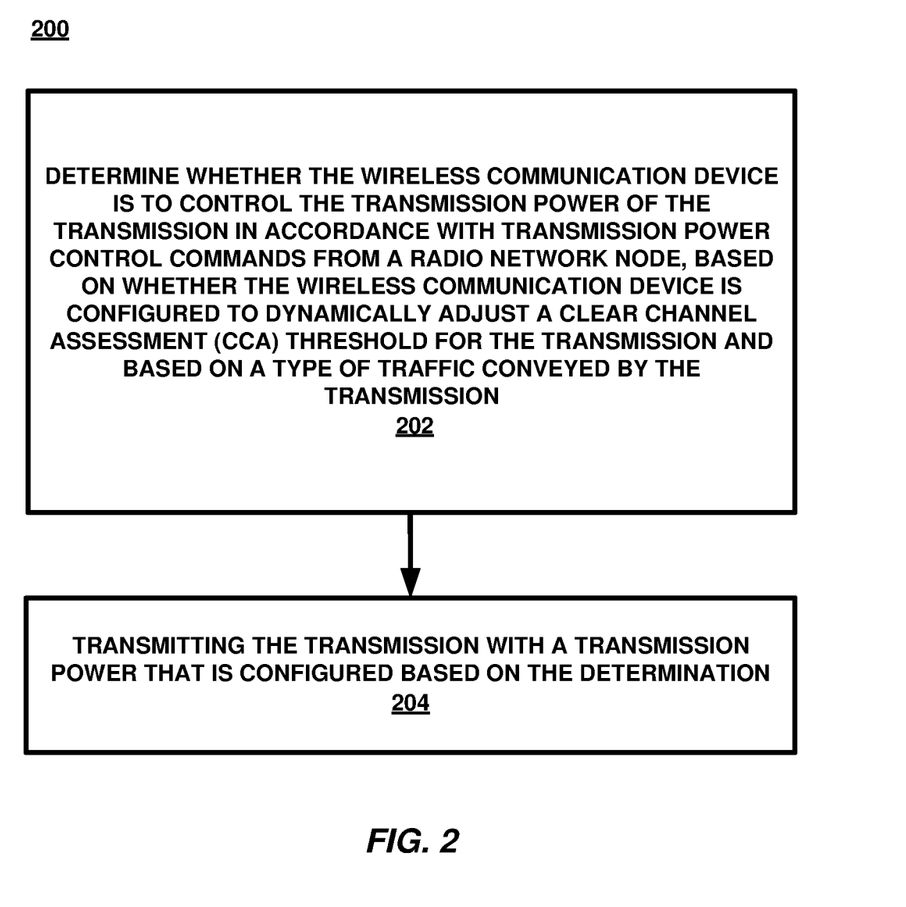
FIG. 2 illustrates a flowchart of an exemplary method implemented by a wireless communication device.

FIG. 2 illustrates an example method 200 for configuring a transmission power of a transmission implemented by a wireless communication device (e.g. of FIG. 1). In some embodiments, method 200 may include, at block 202, determining whether the wireless communication device is to control the transmission power of the transmission in accordance with transmission power control commands from a radio network node. This determination at block 202 may be based on whether the wireless communication device is configured to dynamically adjust a CCA threshold for the transmission (i.e., perform DSC). Additionally, the determination at block 202 may be based on a type of traffic conveyed by the transmission. For instance, in some examples, TPC may not be applied by the device for a transmission where the type of traffic conveyed by that transmission is deemed high-priority (e.g., higher than a threshold level of priority).

In addition, method 200 may include, at block 202, transmitting the transmission with a transmission power that is configured based on the determination of block 202. Though not explicitly described in reference to FIG. 2, method 200 may include one or more aspects described below in reference to method 600 of FIG. 6. As such, though described in reference to separate figures in the present disclosure, methods 200 and 600 may include one or more features of methods 600 and 200, respectively, in certain example embodiments.

Figure 3:
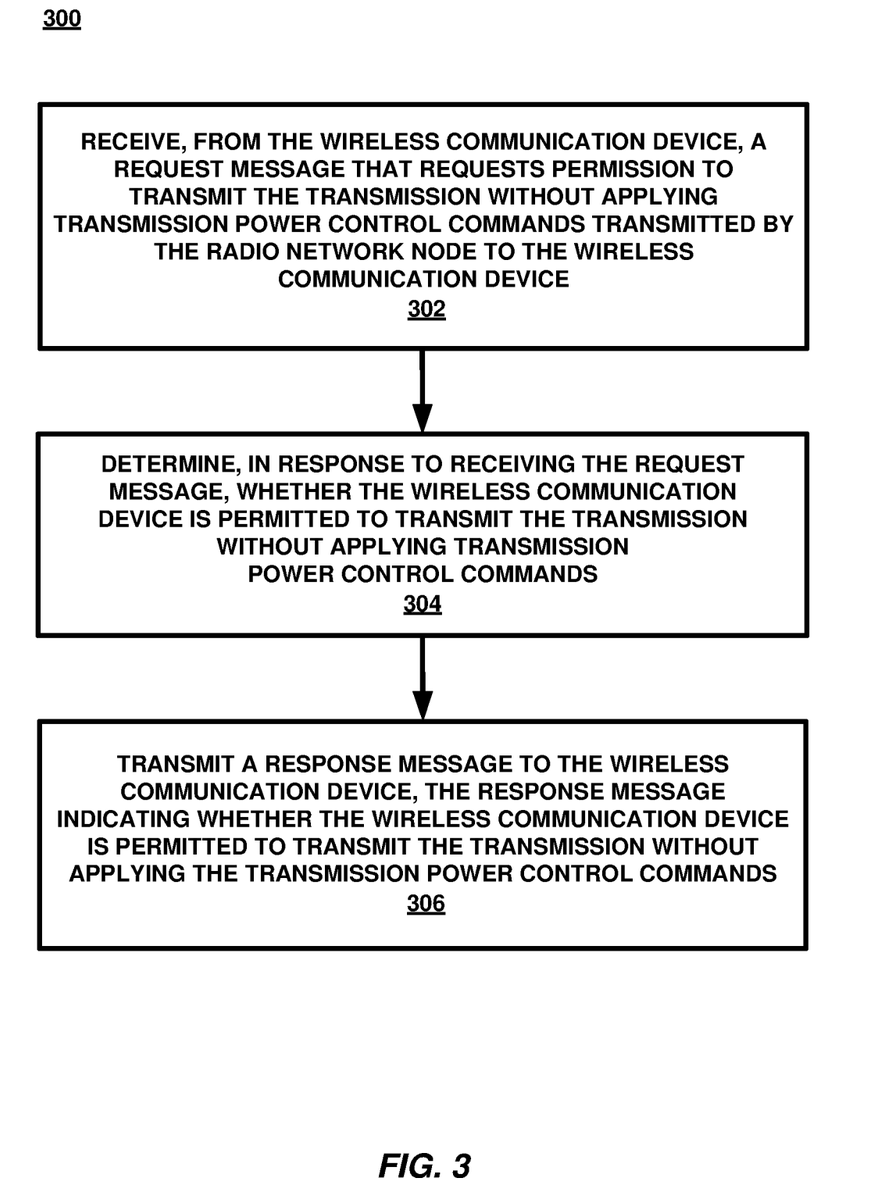
FIG. 3 illustrates a flowchart of an exemplary method implemented by a radio network node.

FIG. 3 illustrates a method 300 performed by a radio network node (e.g., of FIG. 1) for configuring a transmission power of a transmission of high-priority traffic by a wireless communication device configured to dynamically adjust a CCA threshold for the transmission. In some embodiments, method 300 may include, at block 302, receiving, from the wireless communication device, a request message that requests permission to transmit the transmission without applying transmission power control commands transmitted by the radio network node to the wireless communication device. In some examples, this request message may be explicit in that it is communicated in a transmission having a format that is unique to such explicit request messages. Such explicit request messages may be transmitted by the wireless communication device 102 at a power level mandated by TPC commands sent by the radio network node 106. In the implicit request message feature, instead of transmitting a request message of a particular format and at a power commanded by one or more TPC commands, the implicit request message may instead be a transmission (e.g. an initial transmission or a first transmission after a particular waiting period has elapsed) of user data by the wireless communication device 102 and without applying the TPC commands.

In a further feature, method 300 may include, at block 304, determining, in response to receiving the request message, whether the wireless communication device is permitted to transmit the transmission without applying transmission power control commands. In some examples, the determination at block 304 may be based on one or more of a traffic load associated with the radio network node, a wireless communication device load associated with the radio network node, information contained in one or more measurement reports received from one or more wireless communication devices, information indicative of a type of traffic conveyed by the transmission, a frequency of link failure associated with the radio network node; and a rate of retransmissions associated with the radio network node or one or more wireless communication devices in communication with the radio network node.

In addition, method 300 may include, at block 306, transmitting a response message to the wireless communication device, the response message indicating whether the wireless communication device is permitted to transmit the transmission without applying the transmission power control commands. Furthermore, though not explicitly described in reference to FIG. 3, method 300 may include one or more aspects described below in reference to method 700 of FIG. 7. As such, though described in reference to separate figures in the present disclosure, methods 300 and 700 may include one or more features of methods 700 and 300, respectively, in certain example embodiments.

Figure 4:
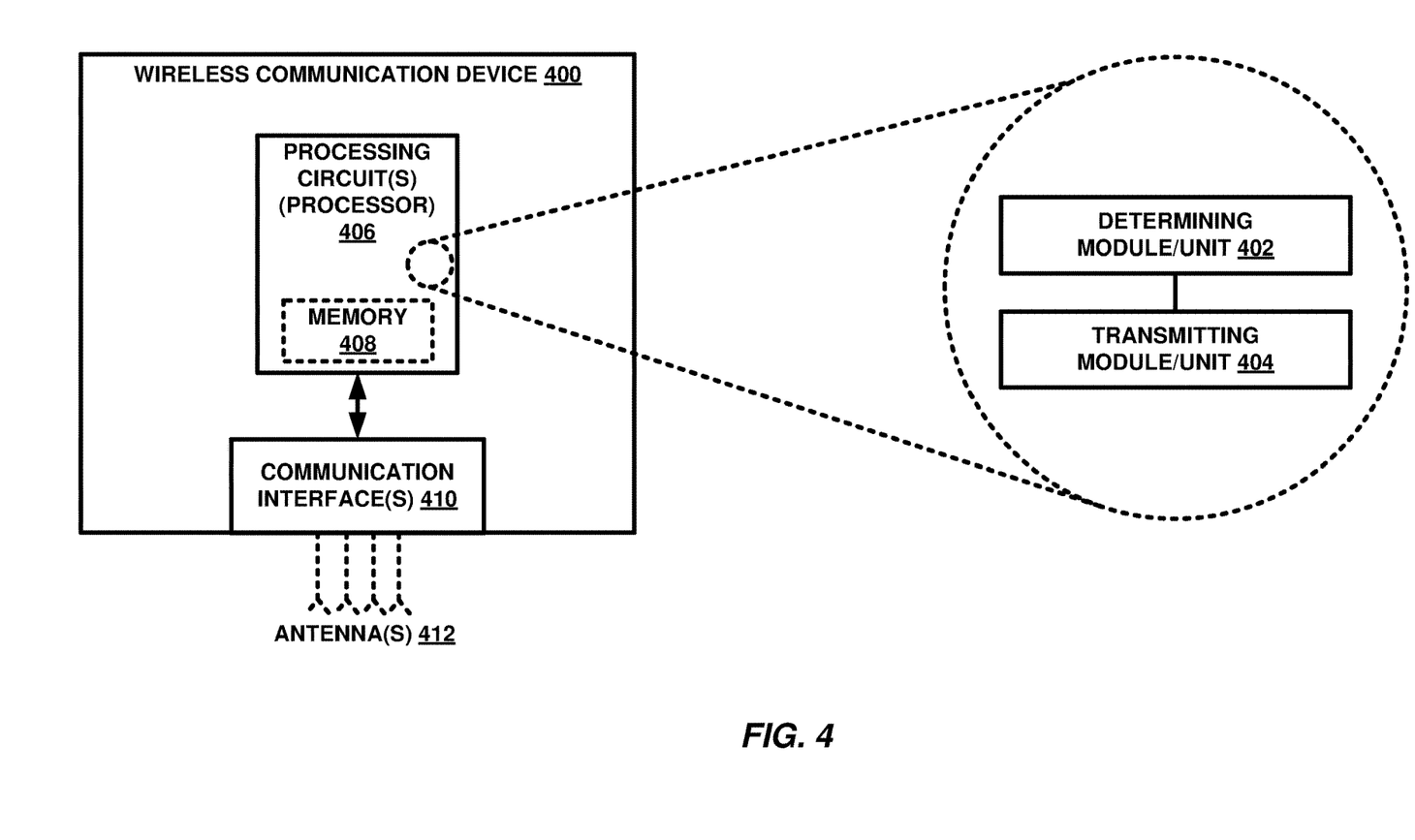
FIG. 4 illustrates details of an example wireless communication device according to one or more embodiments.

FIG. 4 illustrates additional details of a wireless communication device 102 according to one or more embodiments. For purposes of the present disclosure, the wireless communication device 102 may be referred to simply as "the device." The wireless communication device 102 is configured, e.g., via functional means or units, to implement the processing of method 200 in FIG. 2 and/or the method 600 of FIG. 6, below.

The device 102, in some embodiments, includes a determining unit 402 or means for determining whether the wireless communication device is to control the transmission power of the transmission in accordance with transmission power control commands from a radio network node, for instance, based on whether the wireless communication device is configured to dynamically adjust a CCA threshold for the transmission and based on a type of traffic conveyed by the transmission. The device 102 in this case further includes a transmitting unit 404 or means for transmitting the transmission with a transmission power that is configured based on the determination by determining unit 402 or means for determining.

In at least some embodiments, the device 102 may include one or more processing circuits 406 configured to implement the above processing, such as by implementing functional means or units. In one embodiment, for example, the processing circuit(s) 406 implement functional means or units as respective circuits. The circuits in this regard may comprise circuits dedicated to performing certain functional processing and/or one or more microprocessors in conjunction with memory 408. Such functional processing may include any processing described in reference to method 200 or method 600 herein, or any other functionality of device 102 contained in the present disclosure. In embodiments that employ memory 408, which may comprise one or several types of memory such as read-only memory (ROM), random-access memory, cache memory, flash memory devices, optical storage devices, etc., the memory 408 stores program code that, when executed by the one or more for carrying out one or more microprocessors, carries out the techniques described herein.

In one or more embodiments, the device 102 also comprises one or more communication interfaces 410. The one or more communication interfaces 410 include various components (not shown) for sending and receiving data and control signals. More particularly, the communication interface(s) 410 include one or more transmitters that are each configured to use known signal processing techniques, typically according to one or more standards, and is configured to condition a signal for transmission (e.g., over the air via one or more antennas 412). Similarly, the communication interface(s) 410 include one or more receivers that are each configured to convert signals received (e.g., via the antenna(s) 412) into digital samples for processing by the one or more processing circuits. In an aspect, the communication interface(s) 410 and/or antenna(s) 412 may be implemented in, or may be otherwise associated with, transmitting unit 404.

Figure 5:
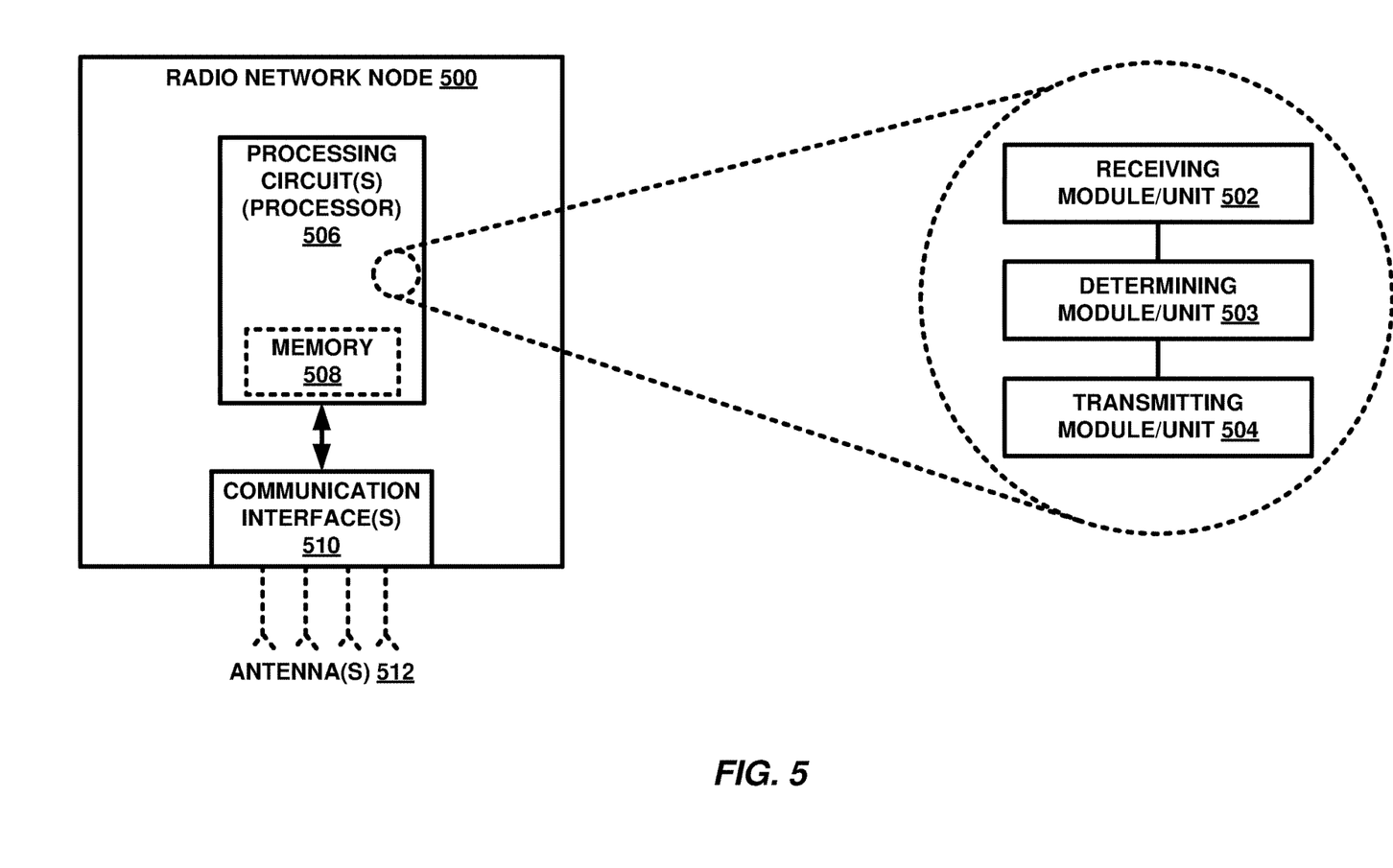
FIG. 5 illustrates details of an example radio network node according to one or more embodiments.

FIG. 5 illustrates additional details of the radio network node 106 according to one or more embodiments. The radio network node 106 is configured, e.g., via functional means or units, to implement the processing of method 300 in FIG. 3. The radio network node 106, in some embodiments, includes a receiving unit 502 or means for receiving, from the wireless communication device, a request message that requests permission to transmit the transmission without applying transmission power control commands transmitted by the radio network node to the wireless communication device. The radio network node 106 in this case further includes a determining unit 503 or means for determining, in response to receiving the request message, whether the wireless communication device is permitted to transmit the transmission without applying transmission power control commands. In addition, radio network node 106 in this case further includes a transmitting unit 504 or means for transmitting a response message to the wireless communication device, the response message indicating whether the wireless communication device is permitted to transmit the transmission without applying the transmission power control commands.

In at least some embodiments, the radio network node 106 comprises one or more processing circuits 506 configured to implement the above processing, such as by implementing functional means or units. In one embodiment, for example, the processing circuit(s) 506 implement functional means or units as respective circuits. The circuits in this regard may comprise circuits dedicated to performing certain functional processing and/or one or more microprocessors in conjunction with memory 508. Such functional processing may include any processing described in reference to method 300 or method 700 herein, or any other functionality of radio network node 106 contained in the present disclosure. In embodiments that employ memory 508, which may comprise one or several types of memory such as read-only memory (ROM), random-access memory, cache memory, flash memory devices, optical storage devices, etc., the memory 508 stores program code that, when executed by the one or more for carrying out one or more microprocessors, carries out the techniques described herein.

In one or more embodiments, the radio network node 106 also comprises one or more communication interfaces. The one or more communication interfaces include various components (not shown) for sending and receiving data and control signals. More particularly, the interface(s) include a transmitter that is configured to use known signal processing techniques, typically according to one or more standards, and is configured to condition a signal for transmission (e.g., over the air via one or more antennas). Similarly, the interface(s) include a receiver that is configured to convert signals received (e.g., via the antenna(s)) into digital samples for processing by the one or more processing circuits 506. In an aspect, the communication interface(s) 510 and/or antenna(s) 512 may be implemented in, or may be otherwise associated with, receiving unit 502 and/or transmitting unit 504.

Figure 6:
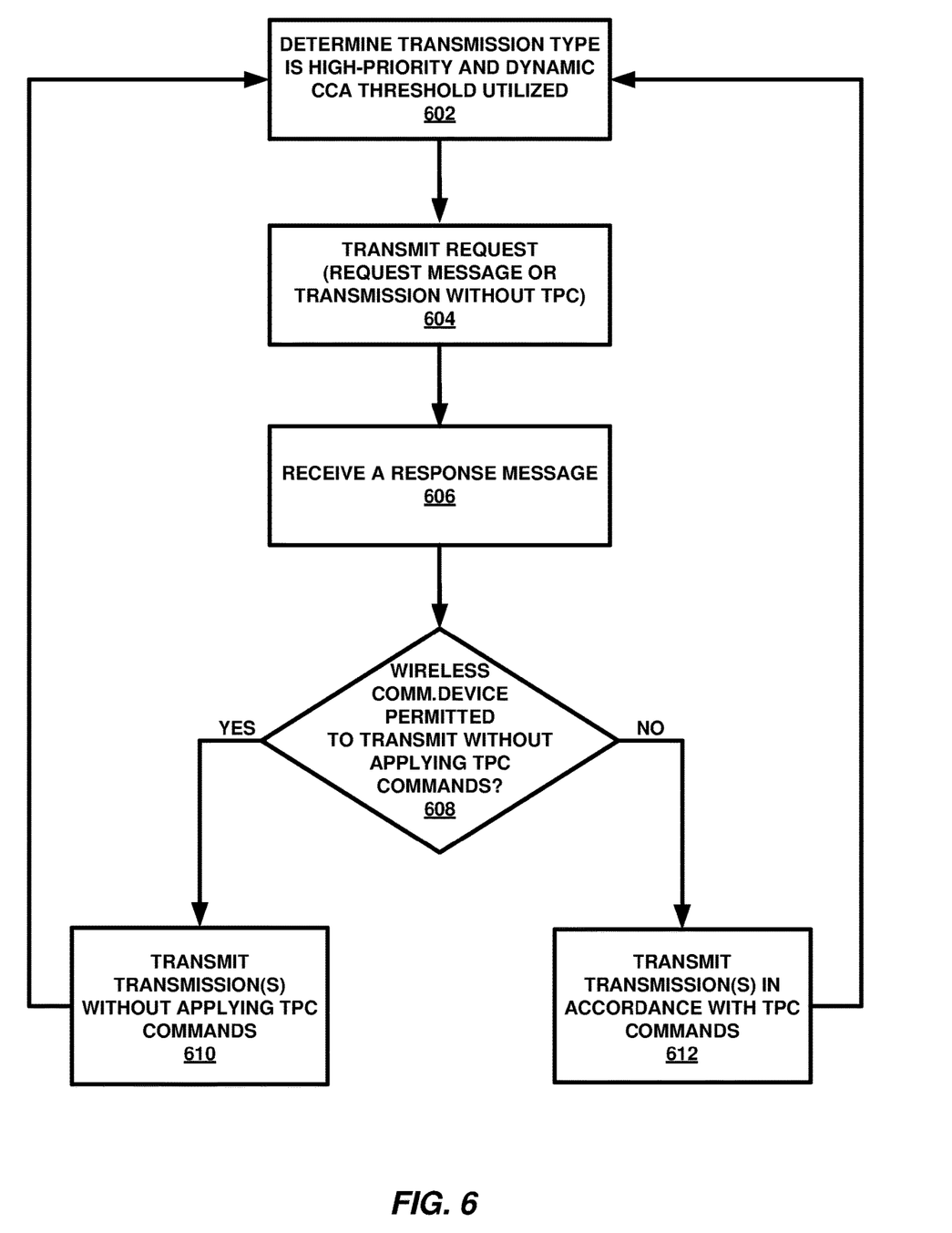
FIG. 6 illustrates a flowchart of an example method executed by a wireless communication device in one or more embodiments.

FIG. 6 illustrates an example method 600 for configuring a transmission power of a transmission implemented by a wireless communication device (e.g. of FIG. 1). As described above, aspects of method 600 may be combined with aspects of method 200. In an aspect, method 600 includes, at block 602 determining that a traffic type of the transmission is high-priority and/or that a dynamic CCA threshold (or DSC) is utilized for opportunistic wireless communication device 102 access to a common communication channel (e.g., a shared uplink channel). Upon making one or both of the determinations at block 602, method 600 may proceed to block 604, where the wireless communication device 102 may transmit a request to a radio network node 106 to request permission to perform transmission without implementing TPC commands from the radio network node 106. In some examples, the request may be a request message of a particular format and structure that is identifiable by the ratio network node 106 and may be transmitted at block 604 in accordance with TPC commands from the radio network node.

In other examples, the request may be the transmission, and may be transmitted without implementing TPC commands from the radio network node 106. In other words, rather than taking any specific form or structure, the request may simply be an uplink transmission of user data (or other data types) at a transmission power other than that specified by one or more TPC commands from the radio network node.

Next, at block 606, the wireless communication device 102 may receive a response message from the radio network node 106 indicating whether the wireless communication device 102 is permitted by the radio network node 106 to perform transmission without implementing the TPC commands. At block 608, the wireless communication device may determine that the response message indicated that transmission is permitted without performing TPC and may therefore proceed to block 610 to transmit the transmission without applying the TPC commands. In an alternative aspect, at block 608 the wireless communication device may determine that it is not permitted to transmit the transmission without applying the TPC commands. In such a scenario, the method 600 may proceed to block 612, where the wireless communication device 102 may transmit the transmission(s) in accordance with the TPC commands. Furthermore, once the transmission is performed at either of blocks 610 or 612, the method 600 may proceed to block 602 where the wireless communication device 102 may wait until a further transmission is needed and again proceed with the method.

Furthermore, though not explicitly described in reference to FIG. 6, method 600 may include one or more aspects described above in reference to method 200 of FIG. 2. For instance, blocks 602, 604, 606, and 608 may be sub-steps of block 202 of method 200 and blocks 610 and 612 may be sub-steps of block 204 of FIG. 2. As such, though described in reference to separate figures in the present disclosure, methods 600 and 200 may include one or more features of methods 200 and 600, respectively, in certain example embodiments.

Figure 7:
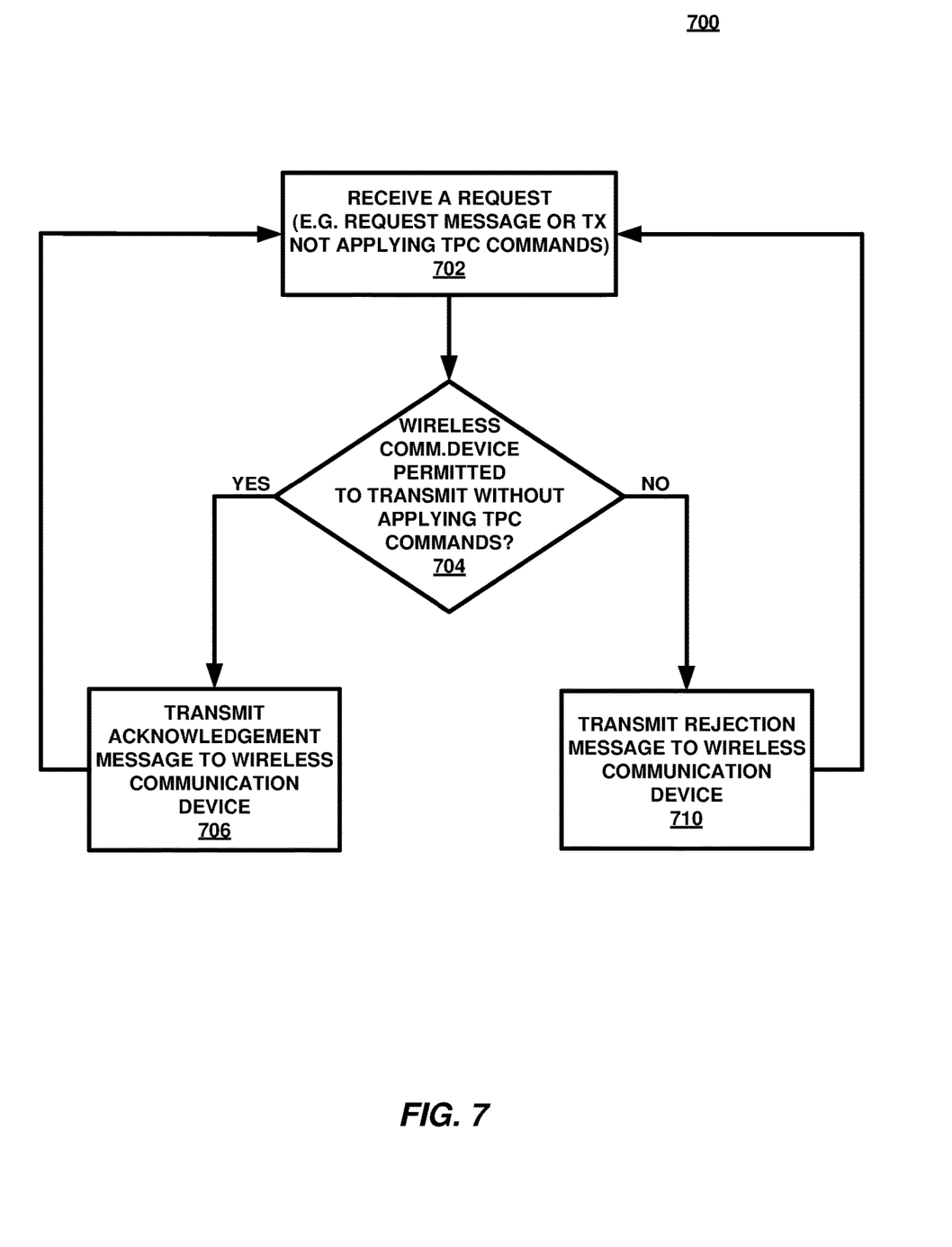
FIG. 7 illustrates a flowchart of an example method executed by a radio network node according to one or more embodiments.

FIG. 7 illustrates a method 700 performed by a radio network node (e.g., of FIG. 1) for configuring a transmission power of a transmission of high-priority traffic by a wireless communication device configured to dynamically adjust a CCA threshold for the transmission. In some embodiments, method 700 may include, at block 702, receiving a request message from the wireless communication device 102 requesting permission to perform transmission without applying one or more TPC commands. The request may be a request message of a particular format and structure that is identifiable by the ratio network node 106 and having a received signal strength that is in an expected range for a request message transmitted in accordance with TPC commands from the radio network node. In other words, the radio network node 106 may identify the request message based on determining one or more of whether the request message conforms to a defined request frame structure, whether the received signal strength of the request message is similar to an expected received signal strength associated with the wireless communication device, and whether the request message comprises information indicative of the type of traffic conveyed by the transmission. For instance, the request message may be identified where the expected received signal strength corresponds to a received signal strength expected where the wireless communication device transmits in accordance with the transmission power control commands.

In other examples, the request may be the transmission, and may be transmitted by the wireless communication device 102 without implementing TPC commands from the radio network node 106. In other words, rather than taking any specific form or structure, the request may simply be an uplink transmission of user data (or other data types) at a transmission power other than that specified by one or more TPC commands from the radio network node. Though this form of request message may not have an identifiable structure because it can be a transmission of user data (or other data types) it may be identified based on its received signal strength at the radio network node 106.

In other words, the radio network node 106 may identify the request message based on determining that the received signal strength of the request message is greater than an expected received signal strength associated with the wireless communication device. Alternatively, the radio network node 106 may identify the request message based on determining that the received signal strength of the request message is greater than the expected received signal strength by at least a threshold amount.

Moving to block 704, the radio network node 106 may proceed to block 704 where the radio network node 106 determines whether the wireless communication device is permitted to transmit the transmission without applying TPC commands. In some examples, the determination at block 704 may be based on one or more of a traffic load associated with the radio network node, a wireless communication device load associated with the radio network node, information contained in one or more measurement reports received from one or more wireless communication devices, information indicative of a type of traffic conveyed by the transmission, a frequency of link failure associated with the radio network node; and a rate of retransmissions associated with the radio network node or one or more wireless communication devices in communication with the radio network node.

Where transmission without applying the TPC commands is determined to be permitted, the method 700 may proceed to block 706, where the radio network node 106 may transmit an acknowledgement message to the wireless communication device 102, which indicates that such transmission is permitted. Alternatively, where such transmission without applying the TPC commands is determined to be not permitted at block 704, the method 700 may proceed to block 710 whereby the radio network node 106 transmits a rejection message to the wireless communication device 102 in response to the request. After either transmission at blocks 706 and/or 710, the method 700 may proceed back to block 702 and may proceed with the method 600 again when another transmission is needed (and optionally after a period of waiting for a transmission to be queued for transmission).

Furthermore, though not explicitly described in reference to FIG. 7, method 700 may include one or more aspects described above in reference to method 300 of FIG. 3. As such, though described in reference to separate figures in the present disclosure, methods 700 and 300 may include one or more features of methods 300 and 700, respectively, in certain example embodiments.

Figure 8:
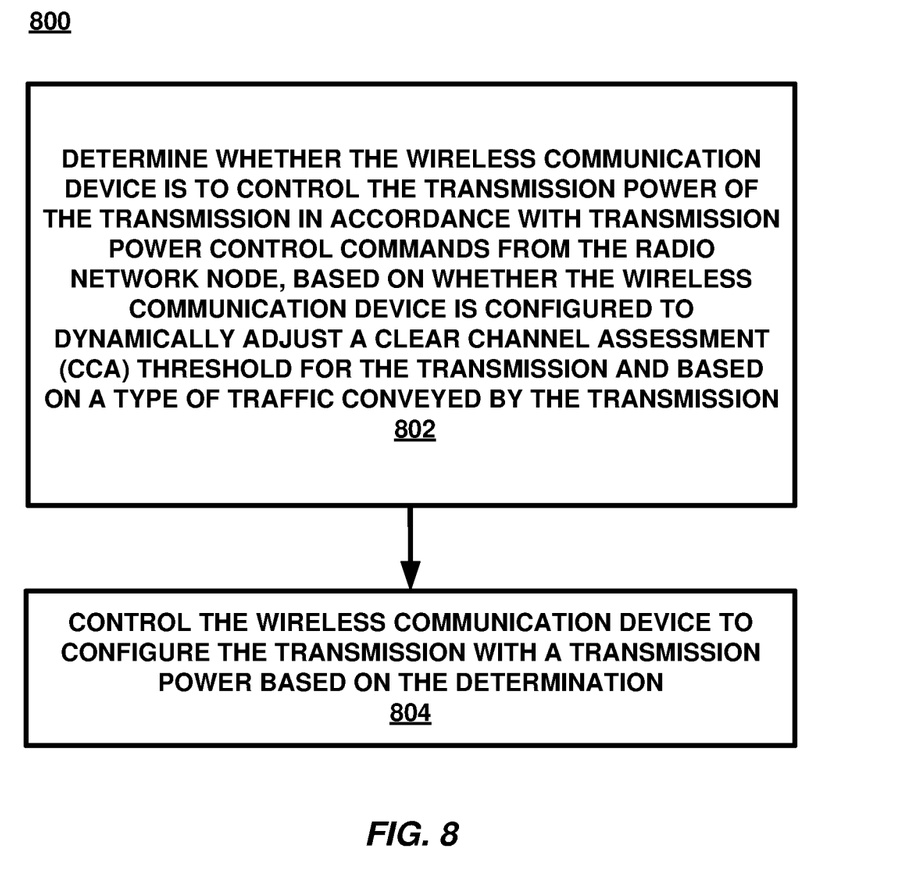
FIG. 8 illustrates a flowchart of an example method executed by a radio network node according to one or more embodiments.

FIG. 8 illustrates another example method 800 performed by a radio network node 106 (e.g., of FIG. 1) for configuring a transmission power of a transmission by a wireless communication device 102. In an aspect, method 800 may include, at block 802, determining whether the wireless communication device 102 is to control the transmission power of the transmission in accordance with transmission power control commands, such as those sent from the radio network node. In addition, this determination by the radio network node 106 can be based on whether the wireless communication device 102 is configured to dynamically adjust a CCA threshold for the transmission 104 and/or can be based on a traffic type conveyed by the transmission 104. In some instances, the radio network node 106 may determine whether the wireless communication device 102 is configured to dynamically adjust a CCA threshold for the transmission 104 and/or can be based on a traffic type conveyed by the transmission 104 based on messaging sent from the wireless communication device 102, from another network node, from a core network node, and/or from memory. In addition, method 800 may include, at block 804, controlling the wireless communication device 102 to configure the transmission with a transmission power, and this controlling aspect may be based on the determination from block 802. And again, though not explicitly described in reference to FIG. 8, method 700 may include one or more aspects described above, such as, but not limited to, those described in reference to method 300 of FIG. 3 and/or method 700 of FIG. 7.

Those skilled in the art will also appreciate that embodiments herein further include corresponding computer programs. A computer program comprises instructions which, when executed on at least one processor of the radio network node or the wireless communication device, cause node or device to carry out any of the respective processing described above. Embodiments further include a carrier containing such a computer program. This carrier may comprise one of an electronic signal, optical signal, radio signal, or computer readable storage medium. A computer program in this regard may comprise one or more code modules corresponding to the means or units described above.

In some embodiments, a radio network node (e.g. the radio network node 106 of FIG. 1, for instance) can correspond to any type of radio network node or any radio network node, which communicates with a wireless communication device (e.g. a mobile station (STA) or user equipment (UE)) and/or with another radio network node. Examples of radio network nodes are a Wifi AP, or, in the context of implementations in cellular or wide area network systems, a base station, Node B, MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core radio network node (e.g. MSC, MME etc.), O&M, OSS, SON, positioning node (e.g. E-SMLC), MDT etc.

In some embodiments the wireless communication device 102 may be a mobile station STA configured to communicate according to WiFi communication standards defined in the IEEE 802.11 family of specifications. In alternative implementations, the wireless communication device may be a user equipment as understood and defined as a mobile communication terminal utilized in cellular or other wide area networks. Generally, the non-limiting term UE is used and it refers to any type of wireless device communicating with a radio network node and/or with another UE in a cellular or mobile communication system. In some examples, the wireless communication devices referred to and/or described herein (e.g. the wireless communication device 102 of FIG. 1) may be a UE. However it should be noted that the UE does not necessarily have a "user" in the sense of an individual person owning and/or operating the device.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for configuring a transmission power of a transmission by a wireless communication device, the method comprising:
   determining whether the wireless communication device is to control the transmission power of the transmission in accordance with transmission power control commands from a radio network node, based on whether the wireless communication device is configured to dynamically adjust a clear channel assessment (CCA) threshold for the transmission and based on a traffic type conveyed by the transmission; and
   transmitting the transmission with a transmission power that is configured based on the determination;
   wherein the determining whether the wireless communication device is to control the transmission power in accordance with the transmission power control commands comprises determining that the wireless communication device is not to control the transmission power in accordance with the transmission power control commands, responsive to determining that the wireless communication device is configured to dynamically adjust the CCA threshold for the transmission and that the traffic type conveyed by the transmission is high-priority; and
   wherein the transmitting the transmission to the radio network node comprises transmitting the transmission to the radio node without applying the transmission power control commands to the transmission based on the determination that the wireless communication device is not to control the transmission power of the transmission.

2. The method of claim 1, further comprising:
   receiving an acknowledgement message from the radio network node responsive to the transmission; and
   transmitting one or more subsequent transmissions without applying the transmission power control commands to the one or more subsequent transmissions based on receiving the acknowledgement message.

3. The method of claim 1, further comprising:
   receiving a rejection message from the radio network node responsive to the transmission; and
   transmitting one or more subsequent transmissions in accordance with the transmission power control commands, based on receiving the rejection message.

4. The method of claim 1, wherein the determining whether the wireless communication device is to control the transmission power in accordance with the transmission power control commands comprises:
   generating, based on whether the wireless communication device is configured to dynamically adjust the CCA threshold for the transmission and based on the traffic type conveyed by the transmission, a request message requesting permission to control the transmission power of the transmission without regard to transmission power control commands from the radio network node; and
   transmitting the request message to the radio network node.

5. A method, performed by a radio network node, for configuring a transmission power of a transmission by a wireless communication device configured to dynamically adjust a clear channel assessment (CCA) threshold for the transmission, the method comprising:
   receiving, from the wireless communication device, a request message that requests permission to transmit the transmission without applying transmission power control commands transmitted by the radio network node to the wireless communication device;
   determining, in response to receiving the request message, whether the wireless communication device is permitted to transmit the transmission without applying transmission power control commands; and
   transmitting a response message to the wireless communication device, the response message indicating whether the wireless communication device is permitted to transmit the transmission without applying the transmission power control commands.

6. The method of claim 5, further comprising identifying the request message based on determining that the received signal strength of the request message is greater than an expected received signal strength associated with the wireless communication device.

7. The method of claim 5, wherein the identifying the request message based on determining that the received signal strength of the request message comprises identifying the request message based on determining that the received signal strength of the request message is greater than the expected received signal strength by at least a threshold amount.

8. The method of claim 5, further comprising identifying the request message based on:
   determining whether the request message conforms to a defined request frame structure;
   determining whether the received signal strength of the request message is similar to an expected received signal strength associated with the wireless communication device; and/or
   determining whether the request message comprises information indicative of the traffic type conveyed by the transmission.

9. The method of claim 8, wherein the expected received signal strength corresponds to a received signal strength expected where the wireless communication device transmits in accordance with the transmission power control commands.

10. A wireless communication device for configuring a transmission power of a transmission by the wireless communication device, the wireless communication device comprising:
    processing circuitry;
    memory containing instructions executable by the processing circuitry whereby the wireless communication device is operative to:
       determine whether the wireless communication device is to control the transmission power of the transmission in accordance with transmission power control commands from a radio network node, based on whether the wireless communication device is configured to dynamically adjust a clear channel assessment (CCA) threshold for the transmission and based on a traffic type conveyed by the transmission; and transmit the transmission with a transmission power that is configured based on the determination;

wherein the instructions are such that the wireless communication device is operative to:

determine whether the wireless communication device is to control the transmission power in accordance with the transmission power control commands by determining that the wireless communication device is not to control the transmission power in accordance with the transmission power control commands, responsive to determining that the wireless communication device is configured to dynamically adjust the CCA threshold for the transmission and that the traffic type conveyed by the transmission is high-priority; and transmit the transmission to the radio network node by transmitting the transmission to the radio node without applying the transmission power control commands to the transmission based on the determination that the wireless communication device is not to control the transmission power of the transmission.

11. The wireless communication device of claim 10, wherein the instructions are such that the wireless communication device is operative to:

receive an acknowledgement message from the radio network node responsive to the transmission; and transmit one or more subsequent transmissions without applying the transmission power control commands to the one or more subsequent transmissions based on receiving the acknowledgement message.

12. The wireless communication device of claim 10, wherein the instructions are such that the wireless communication device is operative to:

receive a rejection message from the radio network node responsive to the transmission; and transmit one or more subsequent transmissions in accordance with the transmission power control commands, based on receiving the rejection message.

13. The wireless communication device of claim 10, wherein the instructions are such that the wireless communication device is operative to determine whether the wireless communication device is to control the transmission power in accordance with the transmission power control commands by:

generating, based on whether the wireless communication device is configured to dynamically adjust the CCA threshold for the transmission and based on the traffic type conveyed by the transmission, a request message requesting permission to control the transmission power of the transmission without regard to transmission power control commands from the radio network node; and transmitting the request message to the radio network node.

14. A radio network node for configuring a transmission power of a transmission of high-priority traffic by a wireless communication device configured to dynamically adjust a clear channel assessment (CCA) threshold for the transmission, the radio network node comprising:

processing circuitry;

memory containing instructions executable by the processing circuitry whereby the radio network node is operative to:

receive, from the wireless communication device, a request message that requests permission to transmit the transmission without applying transmission power control commands transmitted by the radio network node to the wireless communication device;

determine, in response to receiving the request message, whether the wireless communication device is permitted to transmit the transmission without applying transmission power control commands; and transmit a response message to the wireless communication device, the response message indicating whether the wireless communication device is permitted to transmit the transmission without applying the transmission power control commands.

15. The radio network node of claim 14, wherein the instructions are such that the radio network node is operative to identify the request message based on determining that the received signal strength of the request message is greater than an expected received signal strength associated with the wireless communication device.

16. The radio network node of claim 15, wherein the instructions are such that the radio network node is operative to identify the request message based on determining that the received signal strength of the request message is greater than the expected received signal strength by at least a threshold amount.

17. The radio network node of claim 14, wherein the instructions are such that the radio network node is operative to identify the request message based on:

determining whether the request message conforms to a defined request frame structure;

determining whether the received signal strength of the request message is similar to an expected received signal strength associated with the wireless communication device; and/or determining whether the request message comprises information indicative of the traffic type conveyed by the transmission.

18. The radio network node of claim 17, wherein the expected received signal strength corresponds to a received signal strength expected where the wireless communication device transmits in accordance with the transmission power control commands.

* * * * *